US012652647B2

(12) United States Patent
Sogabe et al.

(10) Patent No.: US 12,652,647 B2
(45) Date of Patent: Jun. 9, 2026

(54) TERMINAL, BASE STATION, AND WIRELESS COMMUNICATION METHOD

(71) Applicants: DENSO CORPORATION, Kariya-city (JP); TOYOTA JIDOSHA KABUSHIKI KAISHA, Toyota (JP)

(72) Inventors: Haruhiko Sogabe, Kariya-city (JP); Hideaki Takahashi, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 241 days.

(21) Appl. No.: 18/471,265

(22) Filed: Sep. 20, 2023

(65) Prior Publication Data

US 2024/0073859 A1 Feb. 29, 2024

Related U.S. Application Data

(63) Continuation of application No. PCT/JP2022/014000, filed on Mar. 24, 2022.

(30) Foreign Application Priority Data

Mar. 25, 2021 (JP) ................................. 2021-052279

(51) Int. Cl.
*H04W 68/00* (2009.01)
*H04W 76/28* (2018.01)
(52) U.S. Cl.
CPC ......... *H04W 68/005* (2013.01); *H04W 76/28* (2018.02)

(58) Field of Classification Search
CPC ............... H04W 68/005; H04W 76/28; H04W 52/0216; H04W 52/0229; H04W 52/0235; H04W 52/028; H04W 76/27; H04W 68/02; Y02D 30/70
See application file for complete search history.

(56) References Cited

U.S. PATENT DOCUMENTS

| | | | | |
|---|---|---|---|---|
| 11,903,081 | B2 * | 2/2024 | Park | H04W 72/02 |
| 2019/0165922 | A1 * | 5/2019 | Chavva | H04L 5/1469 |
| 2020/0137602 | A1 * | 4/2020 | Zhang | H04W 72/23 |
| 2022/0046644 | A1 * | 2/2022 | Oh | H04L 5/0048 |
| 2022/0053517 | A1 | 2/2022 | Kim et al. | |

(Continued)

FOREIGN PATENT DOCUMENTS

| | | |
|---|---|---|
| KR | 10-2020-0098962 A | 8/2020 |
| WO | 2020166957 A1 | 8/2020 |

OTHER PUBLICATIONS

CATT, "OneDRX for NR RRC Inactive and Idle," 3GPP TSG-RAN Meeting #112 electronic, R2-2009363, dated Oct. 23, 2020.

(Continued)

*Primary Examiner* — Santiago Garcia
(74) *Attorney, Agent, or Firm* — Harness, Dickey & Pierce, PLC

(57) ABSTRACT

A terminal which communicates with a base station including: a receiving unit which receives a radio resource control (RRC) message including extended discontinuous reception (eDRX) parameters for an RRC inactive state determined by the base station; and a control unit which performs control to monitor control channel candidates in a paging search space configured by paging search space information based on the eDRX parameters included in the RRC message in the RRC inactive state.

7 Claims, 14 Drawing Sheets

(56) References Cited

U.S. PATENT DOCUMENTS

| | | | |
|---|---|---|---|
| 2022/0110148 A1* | 4/2022 | Oh | H04W 72/23 |
| 2022/0210766 A1* | 6/2022 | Liu | H04W 72/30 |
| 2023/0097949 A1* | 3/2023 | He | H04W 52/0235 |
| | | | 370/318 |
| 2023/0224861 A1* | 7/2023 | Al | H04W 76/28 |
| | | | 370/329 |
| 2023/0319780 A1* | 10/2023 | Choi | H04W 68/025 |
| | | | 455/458 |
| 2023/0363048 A1* | 11/2023 | Park | H04W 28/0268 |
| 2023/0363052 A1* | 11/2023 | Lee | H04W 76/28 |
| 2023/0370967 A1* | 11/2023 | He | H04W 68/005 |
| 2023/0397118 A1* | 12/2023 | He | H04W 68/025 |
| 2024/0089994 A1* | 3/2024 | Park | H04W 72/25 |
| 2024/0406946 A1* | 12/2024 | Deng | H04W 72/0446 |
| 2025/0294522 A1* | 9/2025 | Al | H04W 76/28 |

OTHER PUBLICATIONS

Convida Wireless, "Impact of eDRX PTW for Reduced Capability NR Devices," 3GPP TSG-RAN WG2 Meeting #113 electronic, R2-2101797, dated Jan. 15, 2021.

Ericsson, "Extended DRX for RRC_IDLE and RRC_INACTIVE for NR RedCap UE," 3GPP TSG-RAN WG2 #113e, R2-2100986, dated Jan. 15, 2021.

U.S. Appl. No. 18/471,256, filed Sep. 20, 2023, Sogabe et al.

3GPP TS 38.300 V15.11.0 (Sep. 2020).

3GPP TS 36.300 V15.12.0 (Dec. 2020).

Ericsson, "eDRX with RCC Inactive—Solution Update and Evaluation", Temporary Document S2-188389, 3GPP SA WG2 Meeting #128BIS, Aug. 20-24, 2018.

\* cited by examiner

```
-- ASN1START
-- TAG-RRCRELEASE-START

RRCRelease ::=             SEQUENCE {
    rrc-TransactionIdentifier       RRC-TransactionIdentifier,
    criticalExtensions              CHOICE {
        rrcRelease                      RRCRelease-IEs,
        criticalExtensionsFuture        SEQUENCE {}
    }
}

RRCRelease-IEs ::=         SEQUENCE {
    redirectedCarrierInfo           RedirectedCarrierInfo                       OPTIONAL,   -- Need N
    cellReselectionPriorities       CellReselectionPriorities                   OPTIONAL,   -- Need R
    suspendConfig                   SuspendConfig                               OPTIONAL,   -- Need R
    deprioritisationReq             SEQUENCE {
        deprioritisationType            ENUMERATED {frequency, nr},
        deprioritisationTimer           ENUMERATED {min5, min10, min15, min30}
    }                                                                           OPTIONAL,   -- Need N
    lateNonCriticalExtension        OCTET STRING                                OPTIONAL,
    nonCriticalExtension            RRCRelease-v1540-IEs
}
...

SuspendConfig ::=         SEQUENCE {
    full-RNTI                       I-RNTI-Value,
    shortI-RNTI                     ShortI-RNTI-Value,
    ran-PagingCycle                 PagingCycle,
    ran-NotificationAreaInfo        RAN-NotificationAreaInfo                    OPTIONAL,   -- Need M
    t380                            PeriodicRNAU-TimerValue                     OPTIONAL,   -- Need R
    nextHopChainingCount            NextHopChainingCount
    ...,
    [[
    Ran-PagingExtendedDRX-Info-r17  RAN-PagingExtendedDRX-Info-r17              OPTIONAL,   -- Need R
    ]]
}
...

PagingCycle ::=  ENUMERATED {rf32, rf64, rf128, rf256}
...

RAN-PagingExtendedDRX-Info-r17 ::=  SEQUENCE {
    PagingExtendedDRX-Cycle-r17     ENUMERATED {hf1, hf2, hf4, hf6, hf8, hf10, hf12, hf14,
                                               hf16, hf32, hf64, hf128, hf256, spare2, spare1}
                                                                                OPTIONAL,   -- Need S
    PagingTimeWindow-r17            ENUMERATED {s1, s2, s3, s4, s5, s6, s7, s8,
                                               s9, s10, s11, s12, s13, s14, s15, s16}
                                                                                OPTIONAL,   -- Need S
}
...

-- TAG-RRCRELEASE-STOP
-- ASN1STOP
```

Fig. 8

| SuspendConfig field descriptions |
| --- |
| pagingExtendedDRX-Cycle |
| Refers to the UE specific extended DRX cycle for RAN-initiated paging. Value hf1 corresponds to 1 hyper frame, value hf2 corresponds to 2 hyper frames and so on. If this field is absent, the extended DRX cycle for RAN-initiated paging is the same as the one for CN-initiated paging configured by the NAS layer, as specified in TS 24.501. |
| pagingTimeWindow |
| Refers to the UE specific Paging Time Window for RAN-initiated paging. Value s1 corresponds to 1 second, value s2 corresponds to 2 seconds, and so on. If this field is absent, the Paging Timing Window for RAN-initiated paging is the same as the one for CN-initiated paging configured by the NAS layer, as specified in TS 24.501. |

Fig. 9

```
-- ASN1START
-- TAG-RRCSETUPREQUEST-START

RRCSetupRequest ::=          SEQUENCE {
    rrcSetupRequest              RRCSetupRequest-IEs
}

RRCSetupRequest-IEs ::=      SEQUENCE {
    ue-Identity                  InitialUE-Identity,
    establishmentCause           EstablishmentCause,
    spare                        BIT STRING (SIZE (1))
    [[
    Ran-PagingExtendedDRX-Info-r17   RAN-PagingExtendedDRX-Info-r17    OPTIONAL,    -- Need R
    ]]
}

InitialUE-Identity ::=       CHOICE {
    ng-5G-S-TMSI-Part1           BIT STRING (SIZE (39)),
    randomValue                  BIT STRING (SIZE (39))
}

EstablishmentCause ::=       ENUMERATED {
    emergency, highPriorityAccess, mt-Access, mo-Signalling,
    mo-Data, mo-VoiceCall, mo-VideoCall, mo-SMS, mps-PriorityAccess, mcs-PriorityAccess,
    spare6, spare5, spare4, spare3, spare2, spare1}

RAN-PagingExtendedDRX-Info-r17 ::=   SEQUENCE {
    pagingExtendedDRX-Cycle-r17     ENUMERATED {hf1, hf2, hf4, hf6, hf8, hf10, hf12, hf14, hf16, hf32, hf64, hf128, hf256, spare2, spare1}
    pagingTimeWindow-r17            ENUMERATED {s1, s2, s3, s4, s5, s6, s7, s8, s9, s10, s11, s12, s13, s14, s15, s16}
}
```

*pagingExtendedDRX-Cycle*

Refers to the UE specific extended DRX cycle for RAN-initiated paging. Value hf1 corresponds to 1 hyper frame, value hf2 corresponds to 2 hyper frames, and so on.

*pagingTimeWindow*

Refers to the UE specific Paging Time Window for RAN-initiated paging. Value s1 corresponds to 1 second, value s2 corresponds to 2 seconds, and so on.

Fig. 10

```
-- ASN1START
-- TAG-RRCSETUPCOMPLETE-START

RRCSetupComplete ::=           SEQUENCE {
    rrc-TransactionIdentifier       RRC-TransactionIdentifier,
    criticalExtensions              CHOICE {
        rrcSetupComplete                RRCSetupComplete-IEs,
        criticalExtensionsFuture        SEQUENCE {}
    }
}

RRCSetupComplete-IEs ::=       SEQUENCE {
    selectedPLMN-Identity           INTEGER (1..maxPLMN),
    registeredAMF                   RegisteredAMF                                   OPTIONAL,
    guami-Type                      ENUMERATED {native, mapped}                     OPTIONAL,
    s-NSSAI-list                    SEQUENCE (SIZE (1..maxNrofS-NSSAI)) OF S-NSSAI  OPTIONAL,
    dedicatedNAS-Message            DedicatedNAS-Message,
    ng-5G-S-TMSI-Value              CHOICE {
        ng-5G-S-TMSI                    NG-5G-S-TMSI,                               OPTIONAL,
        ng-5G-S-TMSI-Part2              BIT STRING (SIZE (9))                       OPTIONAL,
    }
    lateNonCriticalExtension        OCTET STRING                                    OPTIONAL,
    nonCriticalExtension            RRCSetupComplete-v1610-IEs                      OPTIONAL
    [[
    Ran-PagingExtendedDRX-Info-r17  RAN-PagingExtendedDRX-Info-r17    OPTIONAL,    --- Need R
    ]]
}

RRCSetupComplete-v1610-IEs ::=     SEQUENCE {
    iab-NodeIndication-r16          ENUMERATED {true}                           OPTIONAL,
    idleMeasAvailable-r16           ENUMERATED {true}                           OPTIONAL,
    ue-MeasurementsAvailable-r16    UE-MeasurementsAvailable-r16                OPTIONAL,
    mobilityHistoryAvail-r16        ENUMERATED {true}                           OPTIONAL,
    mobilityState-r16               ENUMERATED {normal, medium, high, spare}    OPTIONAL,
    nonCriticalExtension            SEQUENCE{}                                  OPTIONAL
}

RegisteredAMF ::=              SEQUENCE {
    plmn-Identity                   PLMN-Identity
    amf-Identifier                  AMF-Identifier
}

RAN-PagingExtendedDRX-Info-r17 ::=    SEQUENCE {
    pagingExtendedDRX-Cycle-r17     ENUMERATED {hf1, hf2, hf4, hf6, hf8, hf10, hf12, hf14, hf16, hf32, hf128, hf256, spare2, spare1}
    PagingTimeWindow-r17            ENUMERATED {s1, s2, s3, s4, s5, s6, s7, s8, s9, s10, s11, s12, s13, s14, s15, s16}
}

-- TAG-RRCSETUPCOMPLETE-STOP
-- ASN1STOP
```

Fig. 11

```
-- ASN1START
-- TAG-RRCRECONFIGURATIONCOMPLETE-START

RRCReconfigurationComplete ::=        SEQUENCE {
    rrc-TransactionIdentifier               RRC-TransactionIdentifier,
    criticalExtensions                      CHOICE {
        rrcReconfigurationComplete              RRCReconfigurationComplete-IEs,
        criticalExtensionsFuture                SEQUENCE {}
    }
}

RRCReconfigurationComplete-IEs ::=    SEQUENCE {
    lateNonCriticalExtension                OCTET STRING                                                OPTIONAL,
    nonCriticalExtension                    RRCReconfigurationComplete-v1530-IEs                        OPTIONAL
}
Ran-PagingExtendedDRX-Info-r17          RAN-PagingExtendedDRX-Info-r17      OPTIONAL,          -- Need R
]]

RRCReconfigurationComplete-v1530-IEs ::=    SEQUENCE {
    uplinkTxDirectCurrentList               UplinkTxDirectCurrentList                                   OPTIONAL,
    nonCriticalExtension                    RRCReconfigurationComplete-v1560-IEs                        OPTIONAL
}

RRCReconfigurationComplete-v1560-IEs ::=    SEQUENCE {
    scg-Response                            CHOICE {
        nr-SCG-Response                         OCTET STRING (CONTAINING RRCReconfigurationComplete),
        eutra-SCG-Response                      OCTET STRING
    }                                                                                                   OPTIONAL,
    nonCriticalExtension                    RRCReconfigurationComplete-v1610-IEs                        OPTIONAL
}

RRCReconfigurationComplete-v1610-IEs ::=    SEQUENCE {
    ue-MeasurementsAvailable-r16            UE-MeasurementsAvailable-r16                                OPTIONAL,
    needForGapsInfoNR-r16                   NeedForGapsInfoNR-r16                                       OPTIONAL,
    nonCriticalExtension                    SEQUENCE {}                                                 OPTIONAL
}

RAN-PagingExtendedDRX-Info-r17 ::=      SEQUENCE {
    pagingExtendedDRX-Cycle-r17             ENUMERATED {hf1, hf2, hf4, hf6, hf8, hf10, hf12, hf14, hf16, hf32, hf64, hf128, hf256, spare2, spare1}
    pagingTimeWindow-r17                    ENUMERATED {s1, s2, s3, s4, s5, s6, s7, s8, s9, s10, s11, s12, s13, s14, s15, s16}
}

-- TAG-RRCRECONFIGURATIONCOMPLETE-STOP
-- ASN1STOP
```

TERMINAL, BASE STATION, AND WIRELESS COMMUNICATION METHOD

CROSS-REFERENCE TO RELATED APPLICATION

This application is a continuation application of International Patent Application No. PCT/JP2022/014000, filed Mar. 24, 2022, which designated the U.S. and claims the benefit of priority from Japanese Patent Application No. 2021-052279, filed on Mar. 25, 2021, the entire contents of which are incorporated herein by reference.

TECHNICAL FIELD

This disclosure relates to a terminal, a base station, and a wireless communication method.

BACKGROUND

In the 3rd Generation Partnership Project (3GPP) as an international standards organization, New Radio (NR) Release 15 as the 5th generation (5G) RAT (Radio Access Technology) is specified as a successor to Long Term Evolution (LTE) as the 3.9th generation RAT and LTE-Advanced as the 4th generation RAT, for example, Non-Patent Document 1: 3GPP TS 38.300 V15.11.0 (2020-09).

Further, considering such a terminal that power consumption is further limited in LTE (Long Term Evolution) like IoT (Internet of Things) equipment, technology called eDRX (extended Discontinuous Reception) to reduce power consumption by limiting a period capable of receiving a radio signal is introduced, for example, Non-Patent Document 2: 3GPP TS 36.300 V15.12.0 (2020-12).

SUMMARY

In the 3GPP, the consideration of functions on the assumption of a new terminal for IoT performing radio access using NR is started so far. Further, eDRX described above is included in the functions being considered. Here, it is defined in NR that the terminal can take three states of an RRC (Radio Resource Control) idle state, an RRC inactive state, and an RRC connected state. However, in the current 3GPP specifications, a processing procedure for notifying the terminal of eDRX configuration information applied to a terminal in the RRC inactive state is not defined.

It is an object of this disclosure to provide a terminal, a base station, and a wireless communication method capable of notifying the terminal of eDRX configuration information applied to the terminal in an RRC inactive state.

A terminal according to one aspect of this disclosure is a terminal which communicates with a base station including: a receiving unit which receives an RRC message including eDRX (extended DRX) parameters for an RRC inactive state determined by the base station; and a control unit which performs control to monitor control channel candidates in a paging search space configured by paging search space information based on the eDRX parameters included in the RRC message in the RRC inactive state.

According to this disclosure, there can be provided a terminal, a base station, and a wireless communication method capable of notifying a terminal of eDRX configuration information applied to the terminal in an RRC inactive state.

BRIEF DESCRIPTION OF DRAWINGS

FIG. 3 is a diagram for describing DRX operation upon paging.

FIG. 7 is a diagram illustrating a specification change example of the 3GPP specifications.

FIG. 8 is a diagram illustrating a specification change example of the 3GPP specifications.

FIG. 9 is a diagram illustrating a specification change example of the 3GPP specifications.

FIG. 10 is a diagram illustrating a specification change example of the 3GPP specifications.

FIG. 11 is a diagram illustrating a specification change example of the 3GPP specifications.

FIG. 12 is a diagram illustrating an example of the hardware configuration of each equipment in the wireless communication system.

FIG. 14 is a diagram illustrating an example of the functional configuration of a base station.

DETAILED DESCRIPTION

Figure 1:
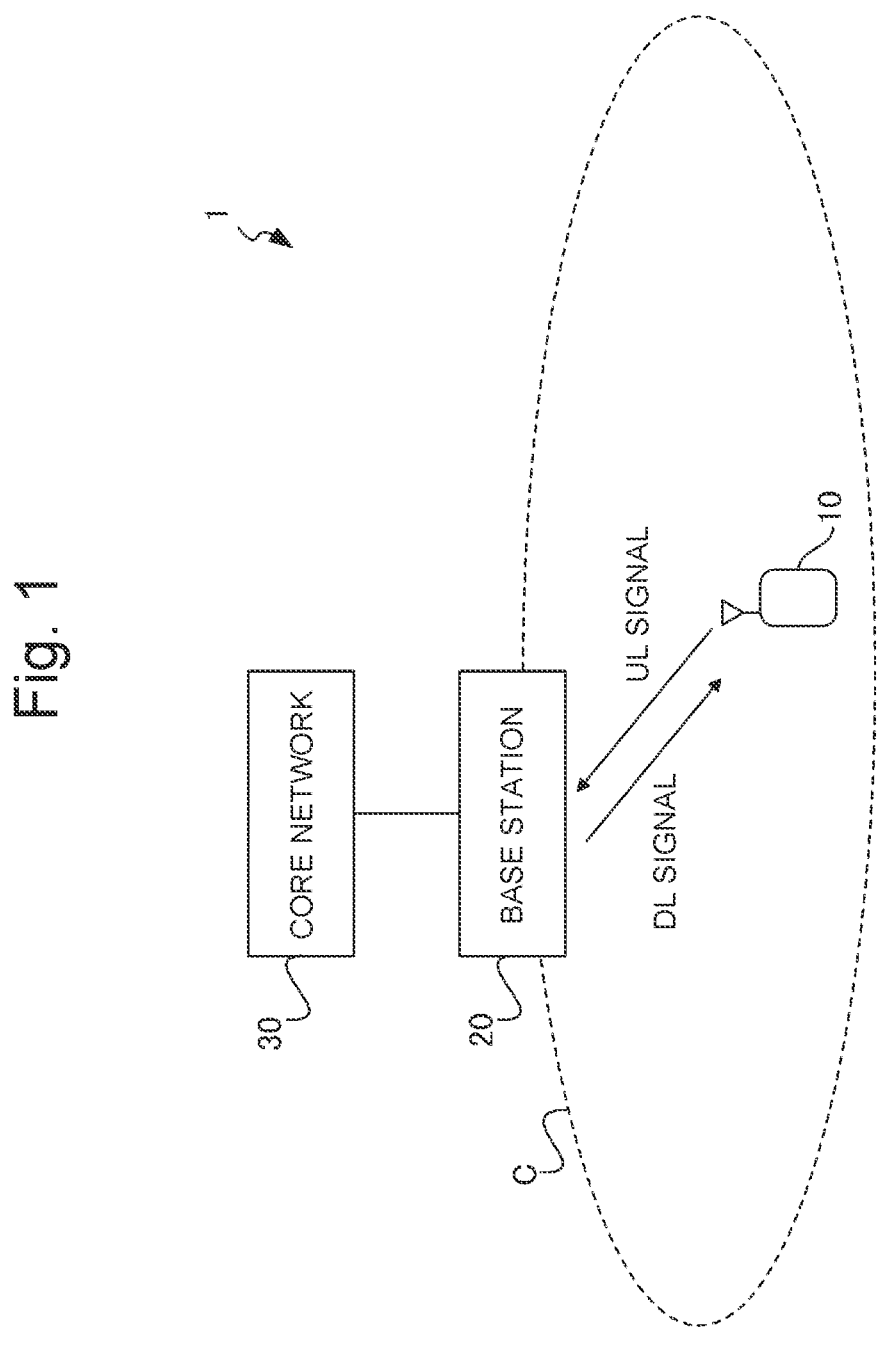
FIG. 1 is a diagram illustrating an example of the overview of a wireless communication system according to an embodiment.

The present embodiment will be described below with reference to the accompanying drawings. In order to facilitate the understanding of the description, the same components in respective drawings are given the same reference numerals as much as possible to omit redundant description.

FIG. 1 is a diagram illustrating an example of the overview of a wireless communication system according to the present embodiment. As illustrated in FIG. 1, a wireless communication system 1 may include a terminal 10, a base station 20, and a core network 30. Note that the number of terminals 10 and base stations 20 illustrated in FIG. 1 is just an illustrative example, and the number is not limited to that illustrated.

As Radio Access Technology (RAT) of the wireless communication system 1, for example, NR is assumed, but it is not limited to NR, and various RATs can be utilized, such as LTE, LTE-Advanced, the 6th generation (6G) RAT or later.

The terminal 10 is a given terminal or equipment such as a smartphone, a personal computer, an in-vehicle terminal, an in-vehicle device, a stationary device, or a telematics control unit (TCU). The terminal 10 may also be called user equipment (UE), a mobile station (MS), a terminal (User Terminal), a radio apparatus, a subscriber terminal, an access terminal, or the like. The terminal 10 may be of a mobile type or a fixed type. The terminal 10 is configured communicably using NR as RAT.

Here, in NR Release 17, support for a terminal on the assumption of lower performance and price range than a terminal for enhanced Mobile Broadband (eMBB) or Ultrareliable and Low Latency Communications (URLLC) introduced in Release 15 or 16 is being considered. Such a terminal is also called a reduced capability (RedCap) terminal or device, which is assumed to be utilized, for example, in an industrial wireless sensor, a surveillance camera (video surveillance), or a wearable device.

The RedCap terminal is assumed to have higher performance than a terminal for low power wide area (LPWA), and a carrier used by the RedCap terminal may have a bandwidth of 20 MHz, 50 MHz, or 100 MHz, for example. Note, for example, that there are Category 1, Long Term Evolution for Machine-type-communication (LTE-M) working with LTE-type RAT, and Narrow Band IoT (NB-IoT) as LPWAs. The maximum bandwidth for Category 1 is 20 MHz, the maximum bandwidth for LTE-M is 1.4 MHz (6 RB), and the maximum bandwidth for NB-IoT is 180 kHz (1 RB). Thus, the RedCap terminal is expected to be used as a middle-range terminal between use for eMBB or URLLC and use for LPWA. The RedCap terminal and a terminal for LPWA are included as the terminal 10 according to the present embodiment.

The base station 20 forms one or more cells C to communicate with the terminal 10 using each of the cells C. The cell C may also be mutually rephrased as a serving cell, a carrier, a component carrier (CC), and the like. The base station 20 may also be called a gNodeB (gNB), an en-gNB, a Next Generation-Radio Access Network (NG-RAN) node, an eNB, a low-power node, a Central Unit (CU), a Distributed Unit (DU), a gNB-DU, a Remote Radio Head (RRH), or an Integrated Access and Backhaul/Backhauling (IAB) node. The base station 20 is not limited to one node, and may be composed of two or more nodes (for example, a combination of a lower node such as DU and an upper node such as CU).

The core network 30 is, for example, an NR-compatible core network (5G Core Network: 5GC), but the core network 30 is not limited thereto. A device on the core network 30 (hereinafter, which may also be called a "core network device") performs mobility management such as paging and location registration of the terminal 10. The core network device may be connected to the base station 20 through a given interface (for example, S1 or NG interface).

The core network device includes at least one of multiple functions such as AMF (Access and Mobility Management Function) for managing information related to access and mobility management, SMF (Session Management Function) for session management, User Plane Function (UPF) for U plane transmission control, and NSSF (Network Slice Selection Function) for network slice management. Each of these functions is implemented in one or more physical or logical devices.

In the wireless communication system 1, the terminal 10 receives a downlink (DL) signal from the base station 20 and/or transmits an uplink (UL) signal. In the terminal 10, one or more carriers may be configured. The bandwidth of each carrier is, for example, in a range of 5 MHz to 400 MHz. One or more bandwidth parts (BWPs) may be configured on one carrier. One BWP has at least part of the bandwidth of the carrier.

UE State

Next, RRC states of the terminal 10 defined in NR will be described. The RRC states of the terminal 10 include an RRC idle state (hereinafter called the "idle state"), an RRC inactive state (hereinafter called the "inactive state"), and an RRC connected state (hereinafter called the "connected state").

Figure 2:
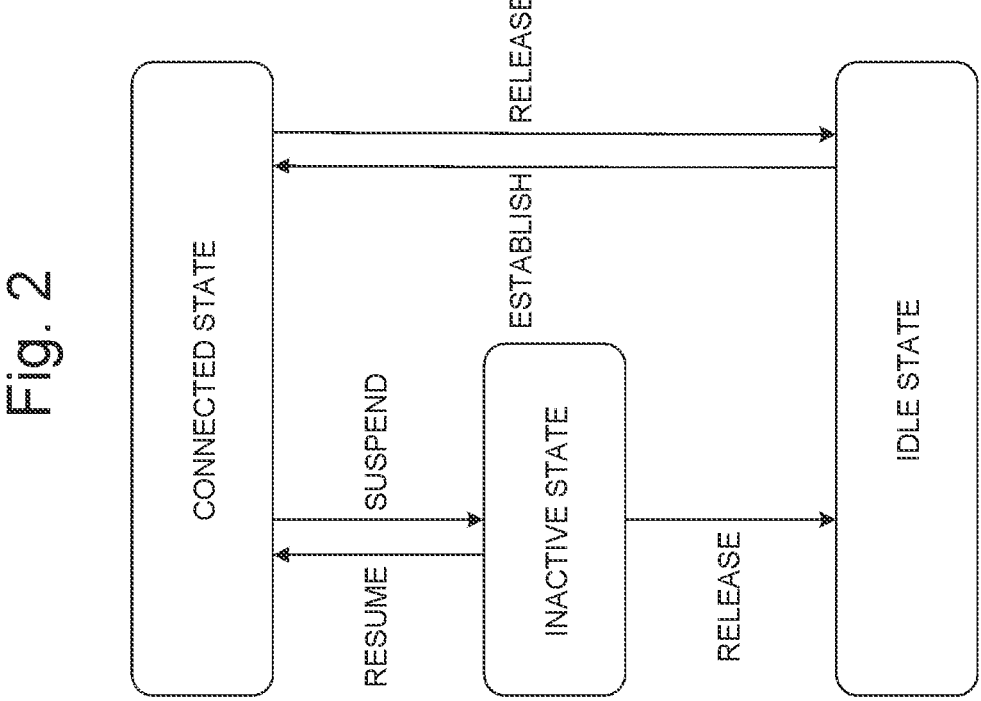
FIG. 2 is a diagram illustrating an example of state transitions of a terminal.

FIG. 2 is a diagram illustrating an example of state transitions of the terminal 10. In FIG. 2, the idle state is a state in which RRC connection between the terminal 10 and the base station 20 is not established, which is also called RRC IDLE, idle mode, RRC idle mode, or the like.

The terminal 10 in the idle state camps on a cell C selected by cell selection and/or cell re-selection (hereinafter called "cell selection/cell re-selection") to receive system information broadcast on the cell C. When the RRC connection is established, the terminal 10 in the idle state transitions to the connected state.

The inactive state is a state in which the RRC connection is established but suspended, which is also called RRC_INACTIVE, inactive mode, RRC inactive mode, or the like. The inactive state does not exist in LTE, which is an RRC state newly defined in NR. The terminal 10 in the inactive state camps on a cell C selected by cell selection/cell re-selection to receive system information broadcast on the cell C. Like the idle state, the inactive state can perform power saving of the terminal 10, but, unlike the idle state, RRC context and NAS context are held in the terminal 10, the base station 20, and the core network 30 in the inactive state.

Further, in NR, a RAN notification area (RNA) as an area obtained by subdividing a TA (Tracking Area) is newly defined, and the base station 20 manages the RAN notification area in which terminals 10 in the connected state and the inactive state exist. Further, in NR, technology called "RAN paging" for performing paging in units of RAN notification areas used to call each terminal 10 in the inactive state is introduced. In RAN paging, paging signals are transmitted all at once from two or more base stations 20 that configure RAN notification areas in which terminals 10 in the inactive state exist. Each of the terminals 10 in the inactive state that received each paging signal resumes the RRC connection and transitions to the connected state.

The connected state is a state in which the RRC connection mentioned above is established, which is also called RRC_CONNECTED, connected mode, RRC connected mode, or the like. The terminal 10 in the connected state monitors a PDCCH (Physical Downlink Control Channel) to control reception of a PDSCH (Physical Downlink Shared Channel) based on detected DCI (Downlink Control Information). When the RRC connection is released, the terminal 10 in the connected state transitions to the idle state, while when the RRC connection is suspended, the terminal 10 in the connected state transitions to the inactive state.

Conventional eDRX Technology

Here, conventional eDRX (extended DRX) technology defined in LTE will be described. In LTE, a subframe with a length of time of 1 ms, a radio frame with a length of time of 10 ms, and a hyperframe with a length of time of 10.24 seconds are defined. The position of each radio frame is represented by a number in SFN (System Frame Number) of 0 to 1023. Further, in order to manage a length of time longer than that of the 1024 radio frames, a hyperframe with a length of time of the SFN (that is, 10.24 seconds) of the 0 to 1023 radio frames is defined. The hyperframe is represented by a number in H-SFN (Hyper-SFN (System Frame Number)) of 0 to 1023.

Figure 3:
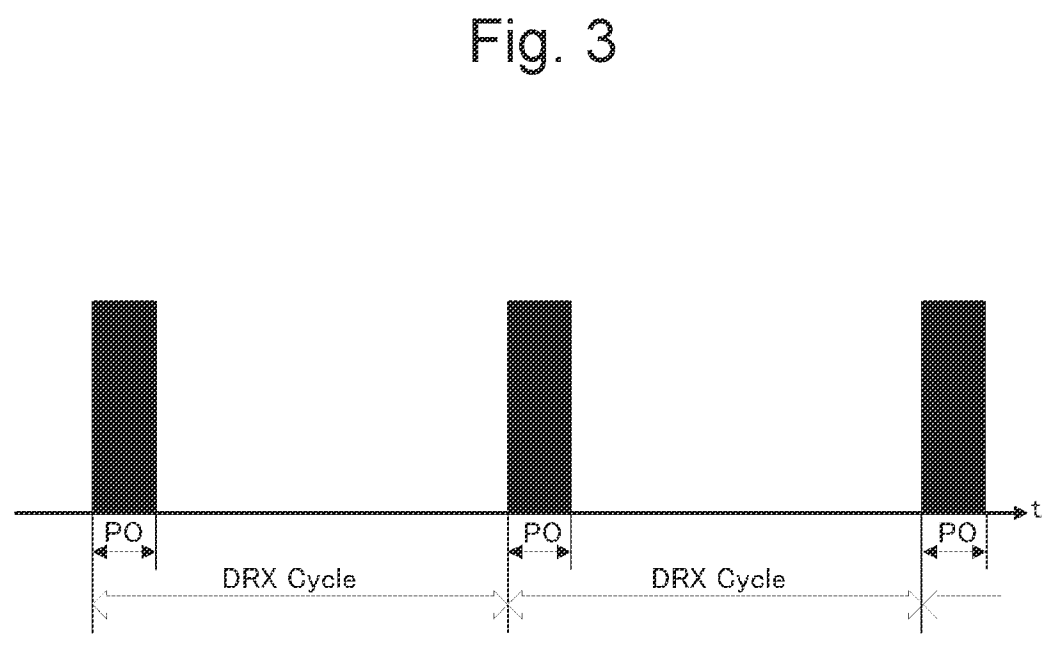

FIG. 3 is a diagram for describing the operation of DRX (Discontinuous Reception) upon paging. As illustrated in FIG. 3, the terminal 10 in the idle state monitors downlink control channel candidates (PDCCH candidates) during periods called POs (Paging Occasions) to receive paging signals. While the terminal 10 is operating according to the DRX configuration, the base station 20 transmits paging signals during the PO periods and does not transmit paging signals during the other periods. The terminal 10 that received a paging signal in each PO period establishes communication with the base station 20 and transitions to the connected state. One PO exists in each DRX cycle. The DRX cycle is a maximum of 2.56 seconds.

Figure 4:
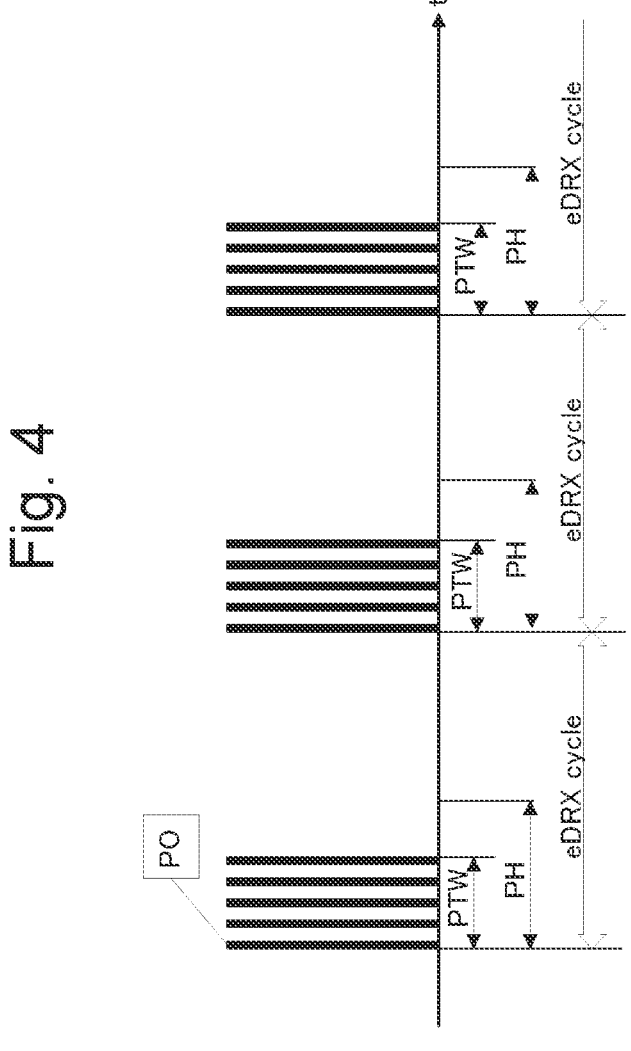
FIG. 4 is a diagram for describing eDRX operation upon paging.

FIG. 4 is a diagram for describing the operation of eDRX upon paging. As illustrated in FIG. 4, the terminal 10 in the idle state monitors downlink control channel candidates during each PO period in each period called a PTW (Paging Time Window) to receive paging signals. One PTW is configured in each hyperframe called a PH (Paging Hyperframe). One PH exists in each eDRX cycle. When the terminal 10 is an NB-IoT terminal, the eDRX cycle is a maximum of 2.91 hours (that is, 1024 Hyperframes), while when the terminal 10 is a terminal other than the NB-IoT terminal, the eDRX cycle is a maximum of about 44 minutes (that is, 256 Hyperframes).

While the terminal 10 is operating according to the eDRX configuration, the base station 20 transmits a paging signal in each PTW period and each PO period, and does not transmit any paging signal in the other periods. The terminal 10 that received the paging signal establishes communication with the base station 20, and transitions to the connected state.

Here, the PH is an H-SFN that satisfies Formula 1 below.

$$H\text{-SFN mod TeDRX},H=(\text{UE\_ID}\_H \text{ mod TeDRX},H), \quad \text{Formula 1:}$$

where "TeDRX,H" indicates the eDRX cycle, which is configured with a length of an integral multiple of the Hyperframe. The UE_ID_H is 10 or 12 most significant bits of a hashed ID defined based on S-TMSI (SAE Temporary Mobile Subscriber Identity) or 5G-S-TMIS (5G S-Temporary Mobile Subscriber Identity).

The SFN as the starting position of the PTW (PTW_start) (start timing) is expressed by Formula 2 and Formula 3 below.

$$\text{SFN}=256*\text{ieDRX} \quad \text{Formula 2:}$$

$$\text{ieDRX}=\text{floor}(\text{UE\_ID}\_H/\text{TeDRX},H)\text{mod } 4 \quad \text{Formula 3:}$$

The SFN as the ending position of the PTW (PTW_end) (end timing) is expressed by Formula 4 below.

$$\text{SFN}=(\text{PTW\_start}+L*100-1)\text{mod } 1024 \quad \text{Formula 4:}$$

where L denotes the time length of the PTW (Paging Time Window length). Parameters for determining the operation of eDRX, such as the eDRX cycle and the time length of the PTW (hereinafter called "eDRX parameters") are configured on the terminal 10 by a message of an upper layer (NAS (Non Access Stratum)). In the following, the "PTW" means the time length of the PTW unless otherwise noted.

Problems in Realizing eDRX in NR

In the 3GPP, the consideration to realize eDRX in NR is currently underway. Here, in LTE, a processing procedure for notifying the eDRX parameters from the core network 30 to the terminal 10 using NAS messages is defined. Therefore, the processing procedure can be applied to NR to notify the terminal 10 of the eDRX parameters applied to the terminal 10 in the idle state. However, a processing procedure for notifying (configuring) the eDRX parameters applied to the terminal 10 in the inactive state to (on) the terminal 10 is not defined in the 3GPP so far (First Problem).

Similarly, in LTE, a processing procedure for the terminal 10 to require a notification of configuration information on eDRX from the core network 30 using NAS messages is defined. Therefore, the processing procedure is applied to NR so that the terminal 10 can require the notification (configuration) of the eDRX parameters applied to the terminal 10 in the idle state from the core network 30. However, the processing procedure for the terminal 10 to require the notification (configuration) of the eDRX parameters applied to the inactive state is not defined in the 3GPP so far (Second Problem).

In the present embodiment, the eDRX parameters applied to the terminal 10 in the inactive state can be notified to the terminal 10 using NAS messages or RRC messages in order to solve the first problem. Further, in the present embodiment, the terminal 10 can be made to transmit, to the base station 20 or the core network 30, the eDRX parameters applied to the terminal 10 in the inactive state so as to require the operation of eDRX in the inactive state in order to solve the second problem.

In the following description, the "eDRX parameters" may mean only parameters for determining the operation of eDRX such as the eDRX cycle and the PTW, or may also include parameters for determining the operation of DRX, such as to configure the DRX cycle and the PO position, in addition to the parameters for determining the operation of eDRX. Further, "eDRX parameters for the inactive state" mean eDRX parameters applied to the terminal 10 in the inactive state. Further, "eDRX parameters for the idle state" mean eDRX parameters applied to the terminal 10 in the idle state.

Processing Procedure for Realizing eDRX in Inactive State

When eDRX is realized in the inactive state, two methods are considered, that is, a method of managing eDRX parameters for the inactive state in the core network 30, and a method of managing eDRX parameters for the inactive state in the base station 20. In the following description, processing for the terminal 10 to perform paging may be the same as processing described in the conventional eDRX technology unless otherwise noted.

Figure 5:
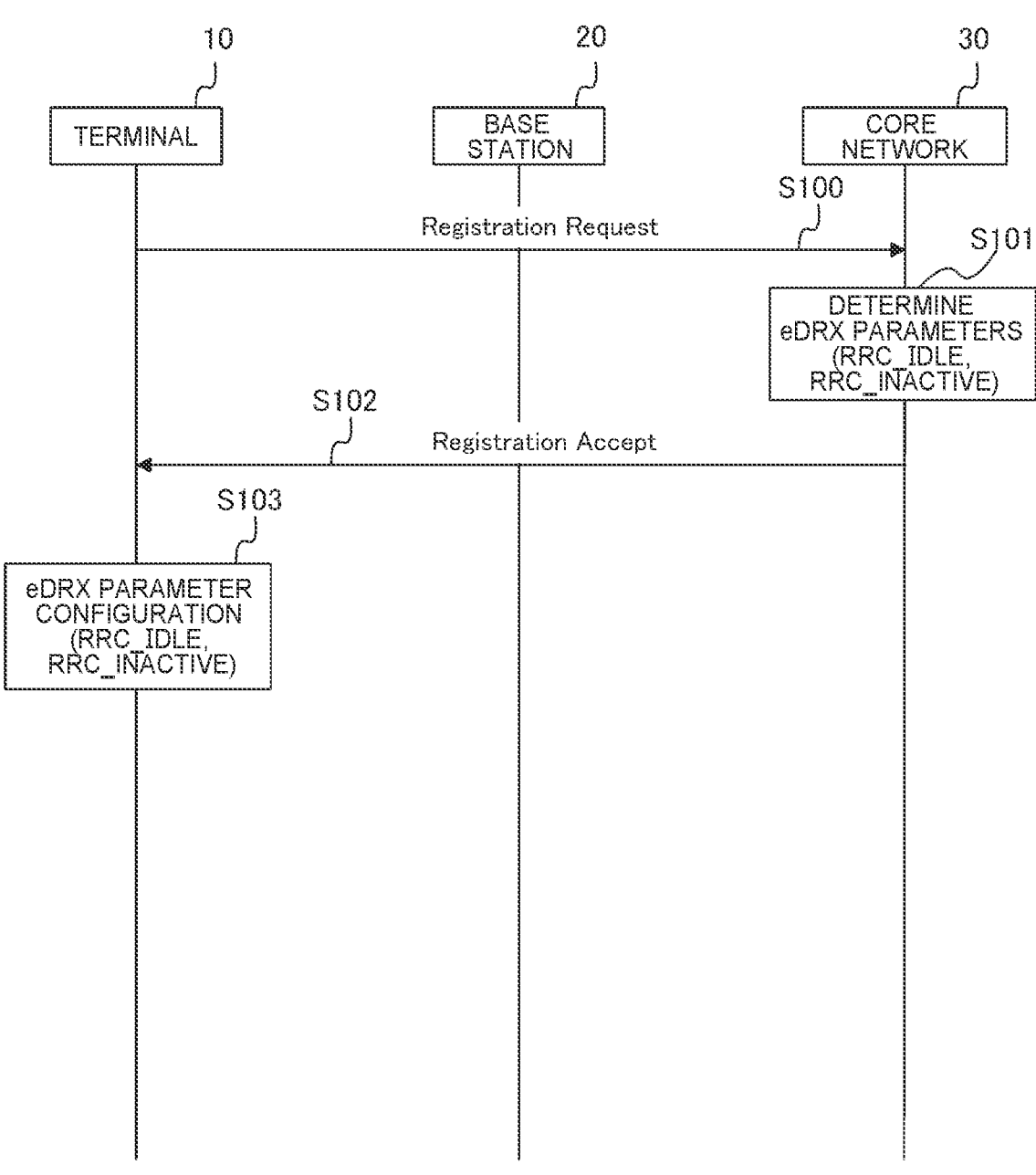
FIG. 5 is a diagram illustrating an example of a processing procedure when eDRX parameters for an inactive state are managed in a core network.

FIG. 5 is a diagram illustrating an example of a processing procedure when the eDRX parameters for the inactive state are managed in the core network 30. It is assumed that the core network 30 is the AMF, but it is not limited thereto.

The terminal 10 that desires the activation of eDRX transmits, to the core network 30, a Registration Request message including the "eDRX parameters" indicative of the operation of eDRX desired to be configured (S100). For example, the terminal 10 that desires the operation of eDRX in which the eDRX cycle is two hyperframes and the PTW is one second transmits, to the core network 30, a registration request including eDRX parameters indicating that the eDRX cycle is two hyperframes and the PTW is one second.

Here, the terminal 10 may include, in the Registration Request message, the "eDRX parameters" indicative of the operation of eDRX for the idle state and the "eDRX parameters" indicative of the operation of eDRX for the inactive state in a manner to distinguish from each other. For example, it is assumed that the terminal 10 desires the operation of eDRX in which the eDRX cycle is eight hyperframes and the PTW is two seconds in the idle state, and desires the operation of eDRX in which the eDRX cycle is two hyperframes and the PTW is one second in the inactive state. In this case, the terminal 10 may transmit, to the core network 30, the "eDRX parameters for the idle state" indicating that the eDRX cycle is eight hyperframes and the PTW is two seconds in the idle state, and the "eDRX parameters for the inactive state" indicating that the eDRX cycle is two hyperframes and the PTW is one second in the inactive state.

Further, when desiring that it does not matter that the "eDRX parameters" for the inactive state are the same as the "eDRX parameters" for the idle state, the terminal 10 may also include, in the Registration Request message, information explicitly or implicitly indicating that the eDRX parameters for the inactive state are the same values as the eDRX parameters for the idle state. For example, when the eDRX parameters for the idle state are included in the Registration Request message but the eDRX parameters for the inactive state are not included (that is, when the eDRX parameters concerned are "absent"), it may imply that the eDRX parameters for the inactive state are the same as the eDRX parameters for the idle state.

Subsequently, based on the registration request received from the terminal 10, the core network 30 determines the eDRX parameters for the idle state and the eDRX parameters for the inactive state (S101). For example, the core network 30 considers the eDRX parameters received from the terminal 10, the network load, the attributes of the terminal 10, and/or the capability of the terminal 10 to determine the eDRX parameters for the idle state and the eDRX parameters for the inactive state to be configured on the terminal 10. The core network 30 may determine that the eDRX parameters to be configured on the terminal 10 are the same values as the eDRX parameters included in the registration request, or different values from the eDRX parameters included in the registration request.

Subsequently, since the core network 30 configures the determined eDRX parameters on the terminal 10, the core network 30 transmits, to the terminal 10, a Registration Accept message including the determined eDRX parameters for the idle state and the determined eDRX parameters for the inactive state (S102). Note that when the determined eDRX parameters for the idle state and the determined eDRX parameters for the inactive state are the same, the core network 30 may explicitly or implicitly include, in the Registration Accept message, information indicating that the eDRX parameters for the inactive state are the same values as the eDRX parameters for the idle state. For example, when the eDRX parameters for the idle state are included in the Registration Request message but the eDRX parameters for the inactive state are not included (that is, when the eDRX parameters concerned are "absent"), it may imply that the eDRX parameters for the inactive state are the same as the eDRX parameters for the idle state.

The terminal 10 configures the eDRX parameters for the idle state and the eDRX parameters for the inactive state included in the Registration Accept message (stores the eDRX parameters in a storage device 12) (S103). Note that when the information indicating that the eDRX parameters for the inactive state are the same values as the eDRX parameters for the idle state is explicitly or implicitly included in the Registration Accept message, the terminal 10 may recognize that the eDRX parameters for the inactive state are the same values as the eDRX parameters for the idle state. In this case, the terminal 10 may configure, in the eDRX parameters for the inactive state, the same values as the eDRX parameters for the idle state. Note that the Registration Request message and the Registration Accept message described above are just an example, and any other messages may be used as long as they are NAS messages.

When the terminal 10 is in the idle state, the terminal 10 monitors control channel candidates in a paging search space during PTWs within PHs indicated in the configured eDRX parameters for the idle state. Further, when transmitting a paging message to the terminal 10 in the idle state, the base station 20 transmits DCI in the paging search space during PTWs within PHs indicated in the eDRX parameters for the idle state configured on the terminal 10. Further, when the terminal 10 is in the inactive state, the terminal 10 monitors control channel candidates in the paging search space during PTWs within PHs indicated in the configured eDRX parameters for the inactive state. Further, when transmitting the paging message to the terminal 10 in the inactive state, the base station 20 transmits DCI in the paging search space during PTWs within PHs indicated in the configured eDRX parameters for the inactive state.

According to the processing procedure described above, the core network 30 can determine the eDRX parameters for the inactive state and notify the terminal 10 thereof. Further, the terminal 10 that desires the activation of eDRX can request notification (configuration) of the eDRX parameters for the inactive state from the core network 30. Further, in the processing procedure described above, when the eDRX parameters for the inactive state are the same as the eDRX parameters for the idle state, the eDRX parameters for the inactive state were omitted, for example. This can reduce the data volume of NAS messages.

Figure 6:
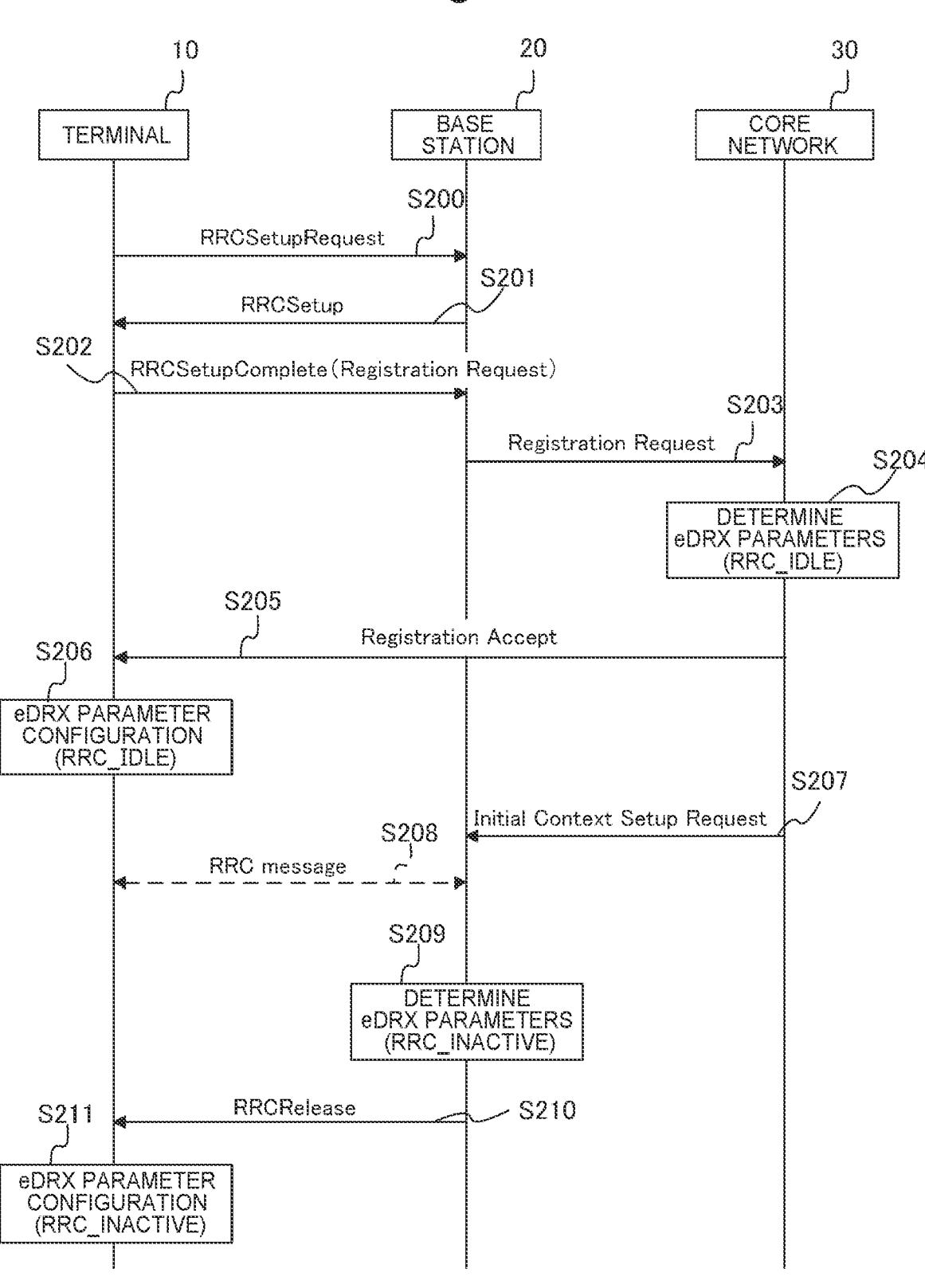
FIG. 6 is a diagram illustrating an example of a processing procedure when configuration information on eDRX for the inactive state is managed in a base station.

FIG. 6 is a diagram illustrating an example of a processing procedure when configuration information on eDRX for the inactive state is managed in the base station 20. For example, the terminal 10 that starts registration processing to the core network 30 transmits an RRC Setup Request message to the base station 20 to establish the RRC connection with the base station 20 (S200). The base station 20 that received the RRC Setup Request transmits an RRC Setup message (S201).

Subsequently, the terminal 10 transmits an RRC Setup Complete message to the base station 20. A Registration Request message as a NAS message to be transmitted to the core network 30 is included in the RRC Setup Complete message (S202). The base station 20 retrieves the Registration Request message included in the RRC Setup Complete message, and transmits (forwards) the Registration Request message to the core network 30 (S203).

Here, in the processing procedure of step S202, the terminal 10 that desires the activation of eDRX includes, in the Registration Request message, "eDRX parameters" indicative of the operation of eDRX for the idle state desired to be configured, and transmits the Registration Request message. Based on the Registration Request message received from the terminal 10, the core network 30 determines the eDRX parameters for the idle state (S204). For example, the core network 30 considers the eDRX parameters received from the terminal 10, the network load, the attributes of the terminal 10, and/or the capability of the terminal 10 to determine the eDRX parameters for the idle state to be configured on the terminal 10. The core network 30 may determine that the eDRX parameters to be configured on the terminal 10 are the same values as the eDRX parameters desired by the terminal 10, or different values from the eDRX parameters desired by the terminal 10.

Subsequently, since the core network 30 configures the eDRX parameters on the terminal 10, the core network 30 transmits, to the terminal 10, a Registration Accept message including the determined eDRX parameters for the idle state (S205). The terminal 10 configures the eDRX parameters for the idle state and the eDRX parameters for the inactive state included in the Registration Accept message (stores the eDRX parameters in the storage device 12) (S206).

The core network 30 transmits an Initial Context Setup Request message to the base station 20 to notify the base station 20 of information required for the terminal 10 to perform communication (S207). Here, the core network 30 includes, in the Initial Context Setup Request, the eDRX parameters for the idle state, and transmits the Initial Context Setup Request to notify the base station 20 of the eDRX parameters for the idle state determined in the core network 30. Note that the eDRX parameters for the idle state are included in the Initial Context Setup Request. The eDRX parameters for the idle state may also be part of Core Network Assistance Information for RRC INACTIVE related to RRC INACTIVE. Note that messages transmitted and received between the base station 20 and the core network 30 are called N2 messages. In the N2 messages, an UE context modification message, a Handover resource allocation message, a Path switch request message, and the like are included in addition to the Initial Context Setup Request message. The core network 30 may also include the eDRX parameters for the idle state in these N2 messages, and transmit the N2 messages to the base station 20. By receiving the NAS messages including the eDRX parameters for the idle state, the base station 20 can recognize the eDRX parameters for the idle state desired by the terminal 10.

Subsequently, communication between the terminal 10 and the base station 20 is started, and RRC messages are transmitted and received as needed (S208). As the RRC messages transmitted from the terminal 10 to the base station 20, for example, there are an RRC Reconfiguration Complete message, an RRC Reestablishment Request message, an RRC Reestablishment Complete message, an RRC Resume Request/RRC Resume Request1 message, an RRC Resume Complete message, and the like.

Here, the terminal 10 that desires the activation of eDRX transmits, to the base station 20, "eDRX parameters" indicative of the operation of eDRX for the inactive state. The terminal 10 may transmit, to the base station 20, the eDRX parameters concerned by including the eDRX parameters in the RRC Setup Request message (S200) or the RRC Setup Complete message (S202). Alternatively, the terminal 10 may transmit, to the base station 20, the eDRX parameters by including the eDRX parameters in the RRC Reconfiguration Complete message, the RRC Reestablishment Request message, the RRC Reestablishment Complete message, the RRC Resume Request message, the RRC Resume Complete message, or the like (S208).

The terminal 10 may include the eDRX parameters for the inactive state in the RRC Setup Complete message, and include the eDRX parameters for the idle state in a Registration Request message included in the RRC Setup Complete message concerned. Since the transmission of the eDRX parameters for the idle state and the transmission of the eDRX parameters for the inactive state can be performed at the same timing, the processing logic of the terminal 10 can be simplified.

For example, it is assumed that, in the inactive state, the terminal 10 desires the operation of eDRX in which the eDRX cycle is two hyperframes and the PTW is one second. In this case, terminal 10 may transmit, to the base station 20, "eDRX parameters for the inactive state" indicating that the eDRX cycle in the inactive state is two hyperframes and the PTW is two seconds.

Further, when desiring that the "eDRX parameters" for the inactive state may be the same as the "eDRX parameters" for the idle state, the terminal 10 may explicitly or implicitly include, in RRC messages, information indicating that the eDRX parameters for the inactive state are the same values as the eDRX parameters for the idle state. For example, when information indicative of requesting the "eDRX parameters" for the inactive state (for example, the name of Information element that stores the eDRX parameters, and the like) is included in the RRC Setup Complete message but specific eDRX parameters for the inactive state are not included (that is, when the eDRX parameters concerned are "absent"), it may imply that the eDRX parameters for the inactive state are the same as the eDRX parameters for the idle state.

Subsequently, based on the eDRX parameters for the inactive state received from the terminal 10, the base station 20 determines eDRX parameters for the inactive state to be configured on the terminal 10 (S209). For example, the base station 20 considers the eDRX parameters received from the terminal 10, the wireless network load, the attributes of the terminal 10, and/or the capability of the terminal 10 to determine the eDRX parameters for the inactive state to be configured on the terminal 10. The base station 20 may determine that the eDRX parameters to be configured on the terminal 10 are the same values as the eDRX parameters desired by the terminal 10, or different values from the eDRX parameters desired by the terminal 10.

Subsequently, the base station 20 transmits, to the terminal 10, an RRC Release message including the determined eDRX parameters for the inactive state to instruct the terminal 10 on the transition to the inactive state (S210). Note that when the determined eDRX parameters for the idle state and the determined eDRX parameters for the inactive state are the same, the base station 20 may explicitly or implicitly include, in the RRC Release message, information indicating that the eDRX parameters for the inactive state are the same values as the eDRX parameters for the idle state. For example, when information indicative of configuring the "eDRX parameters" for the inactive state (for example, the name of Information element that stores the eDRX parameters, and the like) is included in the RRC Release message but specific eDRX parameters are not included (that is, when the eDRX parameters concerned are "absent"), it may imply that the eDRX parameters for the inactive state are the same as the eDRX parameters for the idle state.

The terminal 10 configures the eDRX parameters for the inactive state included in the RRC Release message (stores the eDRX parameters in the storage device 12) (S211). Note that when information indicating that the eDRX parameters for the inactive state are the same values as the eDRX parameters for the idle state is explicitly or implicitly included in the RRC Release message, the terminal 10 may recognize that the eDRX parameters for the inactive state are the same values as the eDRX parameters for the idle state. In this case, the terminal 10 may configure, in the eDRX parameters for the inactive state, the same values as the eDRX parameters for the idle state. After that, like in the description of FIG. 5, the terminal 10 monitors control channel candidates in a paging search space during each PTW within each PH indicated in the configured eDRX parameters for the idle state or the configured eDRX parameters for the inactive state. Further, when transmitting a paging message, the base station 20 transmits DCI in the paging search space during the PTW within the PH indicated in the eDRX parameters for the idle state or the eDRX parameters for the inactive state.

Note that when configuring the determined eDRX parameters on the terminal 10, the base station 20 may include the eDRX parameters for the inactive state in any other RRC messages to be transmitted from the base station 20 to the terminal 10 instead of the RRC Release message. As the other RRC messages, for example, there are an RRC Reconfiguration message, an RRC Reestablishment message, the RRC Resume Request/RRC Resume Request1 message, an RRC Resume message, the RRC Setup message and the like.

According to the processing procedure described above, the base station 20 can determine the eDRX parameters for the inactive state and notify the terminal 10 thereof. Further, the terminal 10 that desires the activation of eDRX can request notification (configuration) of the eDRX parameters for the inactive state from the base station 20.

Further, the base station 20 includes the eDRX parameters for the inactive state in the RRC Release message to be transmitted when making the terminal 10 transition from the connected state to the inactive state. Thus, since the base station 20 has only to notify the eDRX parameters only when the eDRX parameters for the inactive state need to be configured on the terminal 10, radio resources can be used efficiently. Further, when the terminal 10 does not transition to the inactive state, since the eDRX parameters for the inactive state do not need to be stored, the amount of memory in the terminal 10 can be reduced.

Further, when the eDRX parameters concerned are included in an RRC message other than the RRC Release message, the configuration of the eDRX parameters may not be done in time depending on the timing of the transition to the inactive state, and hence there is a possibility that a time lag may occur by the time the transition to the inactive state is actually completed. However, the time lag can be eliminated to enable a rapid transition to the inactive state by including the eDRX parameters for the inactive state in the RRC Release message.

Further, in the present embodiment, when the eDRX parameters for the inactive state are the same as the eDRX parameters for the idle state, the eDRX parameters for the inactive state can be omitted. This can avoid transmitting duplicate data and hence reduce the data volume of RRC messages.

Modifications of eDRX Parameters

The terminal 10, the base station 20, and the core network 30 according to the present embodiment may also use eDRX parameters like those in LTE. In other words, the PH may be determined according to Formula 1, the starting position of the PTW may be determined according to Formula 2 and Formula 3, and the ending position of the PTW may be determined by Formula 4. In this case, the eDRX cycle (TeDRX,H in Formula 1 and Formula 3) and the time length of the PTW (L in Formula 4) are included in the eDRX parameters.

Further, the terminal 10, the base station 20, and the core network 30 according to the present embodiment may include, in the eDRX parameters, given information related to the configuration of the starting position of the PTW to make the starting position of the PTW configurable more flexibly than LTE. For example, information indicative of the number of starting positions of PTWs within PHs (the number of SFNs that can be configured as start SFNs of the PTWs) may be included in the given information related to the configuration of the starting position of the PTW, and the starting position of the PTW may be determined by inputting, in a given formula, the information indicative of the number of starting positions of PTWs within PHs. Further, the ending position of the PTW may be determined according to Formula 4 like in LTE.

$$SFN = (1024 \text{ div } NPTW) * ieDRX \qquad \text{Formula 5:}$$

$$ieDRX = floor(UE\_ID\_H/TeDRX,H) \text{ mod } NPTW \qquad \text{Formula 6:}$$

In Formula 5 and Formula 6, NPTW is information indicative of the number of starting positions of PTWs within PHs. For example, when NPTW=8, since possible values of ieDRX are 0 to 7, the starting position of the PTW is any one of eight SFNs=0, 128, 256, 384, 512, 640, 768, and 896. Note that when NPTW=4, Formula 5 and Formula 6 become the same as Formula 2 and Formula 3, respectively. In other words, use of Formula 5 and Formula 6 can configure the starting position of the PTW more flexibly than that in LTE.

When the starting position of the PTW is determined according to Formula 5 and Formula 6, and the ending position of the PTW is determined by Formula 4, the eDRX cycle (TeDRX,H in Formula 6), the time length of the PTW (L in Formula 4) and the number of starting positions of PTWs within PHs (NPTW in Formula 5) are included in the eDRX parameters.

Further, in the wireless communication system 1 according to the present embodiment, the given information related to the configuration of the starting position of the PTW may include information for specifying a radio frame indicative of the starting position of the PTW. For example, the information for specifying a radio frame indicative of the starting position of the PTW may be information for specifying a specific radio frame number such as SFN=0 or SFN=64. Further, the configuration information on eDRX may include information for specifying a radio frame indicative of the ending position of the PTW (for example, SFN=64, SFN=128, or the like). Thus, the ending position of the PTW can be configured flexibly. In this case, the eDRX cycle, the information for specifying the radio frame indicative of the starting position of the PTW, the information for specifying the radio frame indicative of the ending position of the PTW are included in the eDRX parameters.

SPECIFICATION CHANGE EXAMPLES

FIG. 7 to FIG. 11 are diagrams illustrating specification change examples of the 3GPP specifications. Underlined parts in FIG. 7 to FIG. 11 indicate specifications on information elements that store fields indicative of eDRX parameters and values set in respective fields indicative of the eDRX parameters.

FIG. 7 illustrates a specification change example of the RRC Release message used when the base station 20 configures eDRX parameters for the inactive state on the terminal 10. The eDRX parameters for the inactive state are stored in "Ran-PagingExtendedDRX-Info-r17" included in information element "SuspendConfig." A "pagingExtendedDRX-Cycle-r17" field corresponds to the eDRX cycle, and a "pagingTimeWindow-r17" field corresponds to the PTW. If the information element "Ran-PagingExtendedDRX-Info-r17" exists but the "pagingExtendedDRX-Cycle-r17" field and the "pagingTimeWindow-r17" field do not exist (when they are absent), the terminal 10 will recognize that the same values as the eDRX parameters for the idle state should be configured in the eDRX parameters for the inactive state. FIG. 8 illustrates the specification example of values set in the "pagingExtendedDRX-Cycle-r17" field and the "pagingTimeWindow-r17" field.

FIG. 9 illustrates a specification change example of an RRC Setup Request message transmitted by the terminal 10 that desires the activation of eDRX. The eDRX parameters for the inactive state are stored in the information element "Ran-PagingExtendedDRX-Info-r17." The "pagingExtendedDRX-Cycle-r17" field corresponds to the eDRX cycle, and the "pagingTimeWindow-r17" field corresponds to the PTW. If the information element "Ran-PagingExtendedDRX-Info-r17" exists but the "pagingExtendedDRX- Cycle-r17" field and the "pagingTimeWindow-r17" field do not exist (when they are absent), the base station 20 will recognize that the terminal 10 desires to configure the same values as the eDRX parameters for the idle state in the eDRX parameters for the inactive state. Similarly, FIG. 10 and FIG. 11 illustrate specification change examples of the RRC Setup Complete message and the RRC Reconfiguration Complete message, respectively. In FIG. 10 and FIG. 11, the specification examples of the values set in the "pagingExtendedDRX-Cycle-r17" field and the "pagingTimeWindow-r17" field are the same as those at the bottom of FIG. 9.

Hardware Configuration

Figure 12:
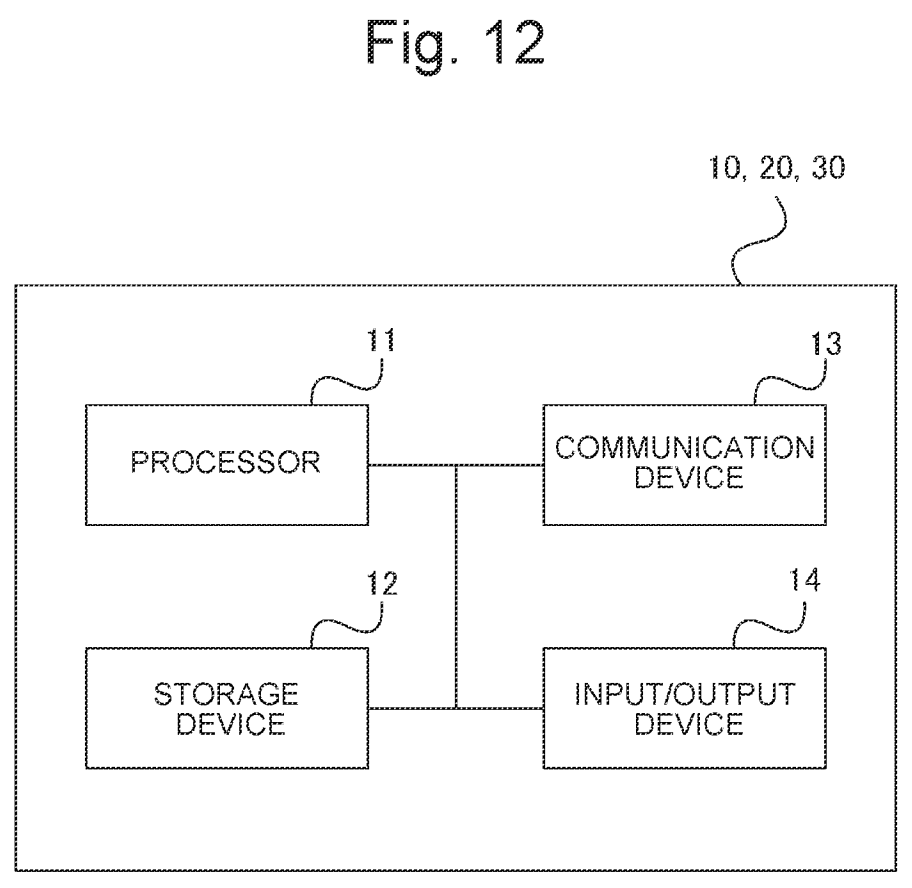

FIG. 12 is a diagram illustrating an example of the hardware configuration of each equipment in the wireless communication system. Each equipment in the wireless communication system 1 (for example, the terminal 10, the base station 20, or the core network 30) includes a processor 11, the storage device 12, a communication device 13 for performing wired or wireless communication, and an input/output device 14 for accepting various input operations and outputting various information.

The processor 11 is, for example, a CPU (Central Processing Unit) to control each equipment in the wireless communication system 1. The processor 11 may read a program from the storage device 12 to perform various processing to be described in the present embodiment. Each equipment in the wireless communication system 1 may also be configured to include one or more processors 11. Further, each equipment concerned may also be called a computer.

The storage device 12 is composed, for example, of storages such as a memory, an HDD (Hard Disk Drive), and/or an SSD (Solid State Drive). The storage device 12 may also store various information required to perform processing by the processor 11 (for example, programs and the like executed by the processor 11).

The communication device 13 is a device for performing communication through wired and/or wireless networks, which may include a network card, a communication module, a chip, an antenna, and the like, for example. Further, an amplifier, an RF (Radio Frequency) device for performing processing on radio signals, and a BB (BaseBand) device for performing processing on baseband signals may be included in the communication device 13.

The RF device performs D/A conversion, modulation, frequency conversion, power amplification, and the like on a digital baseband signal, for example, received from the BB device to generate a radio signal to be transmitted from the antenna. Further, the RF device performs frequency conversion, demodulation, A/D conversion, and the like on a radio signal received from the antenna to generate and transmit a digital baseband signal to the BB device. The BB device performs processing for converting the digital baseband signal to a packet and processing for converting the packet to a digital baseband signal.

The input/output device 14 includes input devices such as a keyboard, a touch panel, a mouse, and/or a microphone, and output devices such as a display and/or a speaker.

Note that the hardware configuration described above is just an example. In each equipment inside the wireless communication system 1, part of hardware illustrated in FIG. 12 may be omitted, or any other hardware unillustrated in FIG. 12 may be included. Further, the hardware illustrated in FIG. 12 may be configured by one or more chips.

Functional Configuration

Terminal

Figure 13:
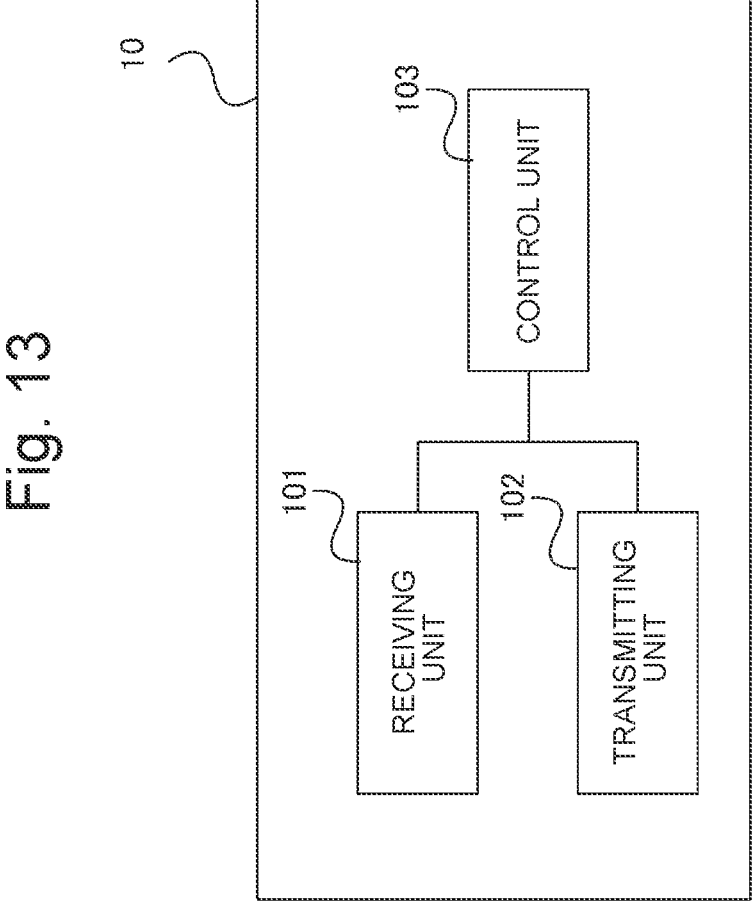
FIG. 13 is a diagram illustrating an example of the functional configuration of a terminal.

FIG. 13 is a diagram illustrating an example of the functional configuration of the terminal 10. The terminal 10 includes a receiving unit 101, a transmitting unit 102, and a control unit 103. All or some of the functions implemented by the receiving unit 101 and the transmitting unit 102 can be realized by using the communication device 13. Further, all or some of the functions implemented by the receiving unit 101 and the transmitting unit 102, and the function of the control unit 103 can be realized by the processor 11 executing a program stored in the storage device 12. Further, the program can be stored on a storage medium. The storage medium with the program stored thereon may be a non-transitory computer readable medium. The non-transitory storage medium is not particularly limited but may be a storage medium such as a USB memory or a CD-ROM.

In the following description, the eDRX parameters are an example of eDRX configuration values. Further, the information element including the eDRX parameters for the inactive state (for example, Ran-PagingExtendedDRX-Info), an RRC message, and/or a NAS message are an example of first configuration information. The first configuration information may also be called configuration information. Further, the information element including the eDRX parameters for the idle state, an RRC message, and/or a NAS message are an example of second configuration information. Further, the information element including the eDRX parameters for the inactive state and/or for the idle state transmitted from the terminal 10, an RRC message and/or a NAS message are an example of request information.

The receiving unit 101 receives downlink signals. The receiving unit 101 may also receive information and/or data transmitted through each downlink signal. Here, for example, the verb "receive" may also include the meaning of performing processing related to reception including at least one of the reception, demapping, demodulation, decoding, monitoring, and measurement of a radio signal.

Further, the receiving unit 101 receives the first configuration information including the eDRX configuration values for the inactive state. The receiving unit 101 may also receive, from the base station 20, an RRC message including the first configuration information. The RRC message may be, for example, the RRC Release message, the RRC Reconfiguration message, the RRC Reestablishment message, the RRC Resume Request message, the RRC Resume message, the RRC Setup message, or the like.

Further, the receiving unit 101 may receive, from the core network 30, a NAS message including the first configuration information. The NAS message may be, for example, a Registration Accept message, but not be limited to this message. Further, the receiving unit 101 may receive second configuration information including the eDRX configuration values for the idle state.

The transmitting unit 102 transmits uplink signals. The transmitting unit 102 may also transmit information and/or data to be transmitted through each uplink signal. Here, for example, the verb "transmit" may also include the meaning of performing processing related to transmission including at least one of the encoding, modulation, mapping, and transmission of a radio signal. Further, the transmitting unit 102 transmits request information including the eDRX configuration values for the inactive state. The transmitting unit 102 may also transmit an RRC message including the request information to the base station 20. The RRC message may be, for example, the RRC Setup Request message, the RRC Reconfiguration Complete message, the RRC Reestablishment Request message, the RRC Reestablishment Complete message, the RRC Resume Request message, the RRC Resume Complete message, or the like.

The transmitting unit 102 may also transmit a NAS message including the request information to the core network 30. The NAS message may be, for example, a registration request message, but not be limited to this message.

Further, when the eDRX configuration values for the inactive state are requested to be the same as the eDRX configuration values for the RRC idle state, the transmitting unit 102 may transmit request information indicating that the eDRX configuration values for the inactive state are the same as the eDRX configuration values for the idle state. For example, the transmitting unit 102 may transmit, in a NAS message, request information including the eDRX configuration values for the RRC idle state but not including the eDRX configuration values for the RRC inactive state. Further, the transmitting unit 102 may transmit an RRC message including information indicative of requesting eDRX parameters for the inactive state but not including eDRX configuration values for the inactive state.

The control unit 103 performs various processing on eDRX based on the eDRX configuration values received at the receiving unit 101. Further, the control unit 103 performs control to monitor control channel candidates (PDCCH Candidates) in a paging search space during each PTW (reception period) within each PH (given H-SFN) indicated by the eDRX configuration values included in the first configuration information in the RRC inactive state.

Further, when eDRX configuration values (for example, eDRX parameters for the inactive state) are not included in the first configuration information, the control unit 103 may perform control to monitor control channel candidates in the paging search space during each reception period in a given H-SFN indicated by the eDRX configuration values (for example, the eDRX parameters for the idle state) included in the second configuration information in the RRC inactive state.

Note that the eDRX configuration values included in the first configuration information may also include information indicative of the number of starting positions of reception periods in given H-SFNs, and the starting position of each reception period may be determined by inputting, in a given formula, the information indicative of the number of starting positions of the reception periods in the given H-SFNs (for example, information indicative of the number of starting positions of PTWs within PHs, that is, NPTW).

Base Station

Figure 14:
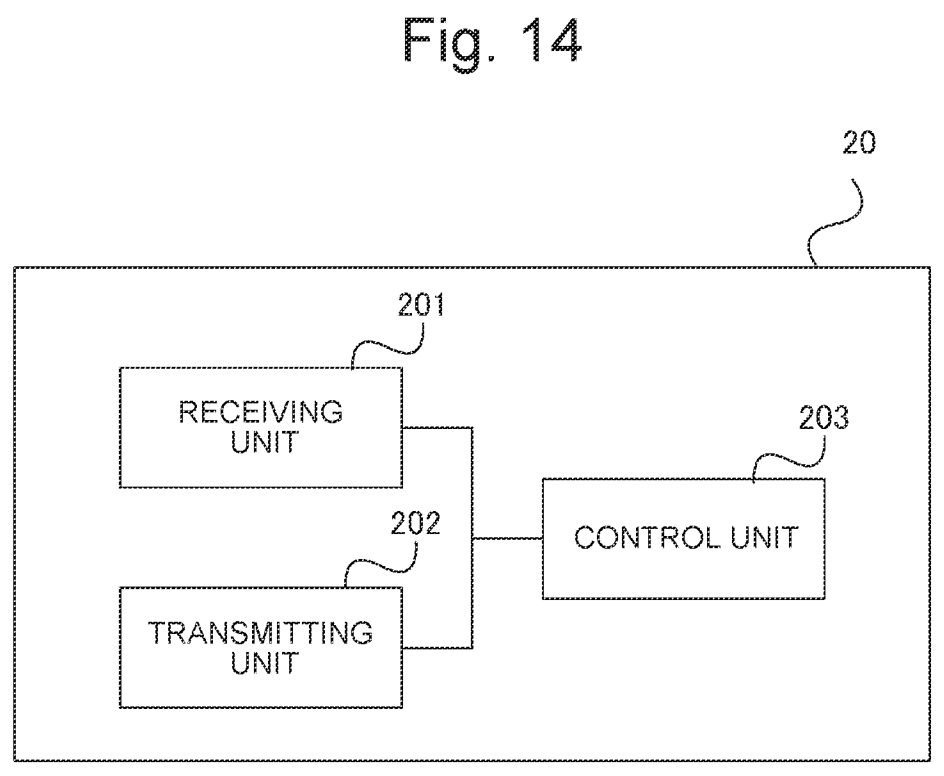

FIG. 14 is a diagram illustrating an example of the functional configuration of the base station 20. The base station 20 includes a receiving unit 201, a transmitting unit 202, and a control unit 203. All or some of the functions implemented by the receiving unit 201 and the transmitting unit 202 can be realized by using the communication device 13. Further, all or some of the functions implemented by the receiving unit 201 and the transmitting unit 202, and the function of the control unit 103 can be realized by the processor 11 executing a program stored in the storage device 12. Further, the program can be stored on a storage medium. The storage medium with the program stored thereon may be a non-transitory computer readable medium. The non-transitory storage medium is not particularly limited but may be a storage medium such as a USB memory or a CD-ROM.

The receiving unit 201 receives uplink signals. The receiving unit 201 may also receive information and/or data transmitted through each of the above-mentioned uplink signals. Further, the receiving unit 201 receives, from the terminal 10, request information including eDRX configuration values for the RRC inactive state.

The transmitting unit 202 transmits downlink signals. The transmitting unit 202 may also transmit information and/or data to be transmitted through each of the above-mentioned downlink signals. Further, the transmitting unit 202 transmits, to the terminal 10, first configuration information including eDRX configuration values for the RRC inactive state. Further, the transmitting unit 202 transmits, to the terminal 10, configuration information including the eDRX configuration values to be applied to the terminal 10 in the RRC inactive state.

The control unit 203 controls RAN paging processing for the terminal 10 in the RRC inactive state. Further, the control unit 203 performs control to transmit, to the terminal 10 in the RRC inactive state, downlink control information (for example, DCI) in the paging search space during each PTW (reception period) within each PH (given H-SFN) indicated by the eDRX configuration values included in the first configuration information.

Supplementation

The eDRX parameters, the information element including the eDRX parameters, the RRC message including the eDRX parameters and/or the NAS message including the eDRX parameters are an example of eDRX configuration information.

The fact that information indicating that the eDRX parameters for the inactive state are the same values as the eDRX parameters for the idle state is explicitly or implicitly included may also be that a specific string or number such as NULL is included in each of the eDRX parameters, for example, for the inactive state.

To "monitor control channel candidates in the paging search space" may also be represented to "monitor control channel candidates in a search space configured by "Paging Search space information.

In the aforementioned embodiment, an example of a first time unit may be one hyperframe (10.24 sec), an example of a second time unit may be one radio frame (10 ms), and an example of a third time unit may be one subframe (1 ms). Further, it may be defined that the second time unit is shorter than the first time unit, and the third time unit is shorter than the second time unit. Further, an example of a number indicative of each position of the second time unit cyclically repeated may be an SFN, and an example of a number indicative of each position of the first time unit cyclically repeated may be an H-SFN. For example, the H-SFN may also be represented as a first time interval of a position indicated by a given number among cyclically repeated first time intervals. Further, the PH may be configured in plural hyperframes among 0 to 1023 in H-SFN.

Various signals, information, and parameters in the aforementioned embodiment may be signaled in any layer. In other words, the various signals, information, and parameters mentioned above may also be replaced with any signals, information, and parameters in any layer such as an upper layer (for example, NAS layer, RRC layer, MAC layer, or the like), a lower layer (for example, physical layer), or the like. Further, the notification of the given information is not limited to explicit notification, which may also be implicit notification (for example, by not notifying the information or using any other information).

Further, the names of various signals, information, parameters, IE, channels, time units, and frequency units are just illustrative examples in the aforementioned embodiment, and the names may be replaced with other names. For example, each slot may be any other name as long as it is a time unit having a given number of symbols. Further, RB may be any other name as long as it is a frequency unit having a given number of subcarriers.

Further, the applications of the terminal 10 in the aforementioned embodiment (for example, for RedCap, IoT, and the like) are not limited to those exemplified, and the terminal 10 may also be used for any other purpose (for example, for eMBB, URLLC, Device-to-Device (D2D), Vehicle-to-Everything (V2X), or the like) as long as it has similar functions.

Further, the format of various information is not limited to that in the aforementioned embodiment, and it may be changed accordingly such as to bit representation (0 or 1), Boolean (true or false), Integer values, or characters. Further, the singular and the plural in the aforementioned embodiment may be mutually changed.

The present embodiment has been described above with reference to the specific examples. However, this disclosure is not limited to these specific examples. Examples in which appropriate design changes are made by those skilled in the art are also included in the scope of this disclosure as long as they have characteristics of this disclosure. The respective elements included in the respective specific examples described above, the arrangement, conditions, shapes of the respective elements, and the like are not limited to those exemplified, and can be changed as appropriate. The combinations of the respective elements included in the respective specific examples described above can be changed as appropriate unless there is a technical contradiction.

As described above, the terminal of the present embodiment may include: a receiving unit which receives first configuration information including eDRX configuration values for an RRC inactive state; and a control unit which performs control to monitor control channel candidates in a paging search space during a reception period in a given H-SFN indicated by eDRX configuration values included in the first configuration information in the RRC inactive state.

Further, in the above terminal, the receiving unit may receive an RRC message including the first configuration information from the base station.

Further, in the above terminal, the receiving unit may receive a NAS message including the first configuration information from the core network.

Further, in the above terminal, the receiving unit may receive second configuration information including eDRX configuration values for an RRC idle state, and when eDRX configuration values are not included in the first configuration information, the control unit may perform control to monitor control channel candidates in a paging search space during a reception period in a given H-SFN indicated by the eDRX configuration values included in the second configuration information in the RRC inactive state.

Further, in the above terminal, the eDRX configuration values included in the first configuration information may include information indicative of the number of starting positions of reception periods in given H-SFNs, and the starting positions of the reception periods may be determined by inputting, in a given formula, the information indicative of the number of starting positions of the reception periods in the given H-SFNs.

Further, the base station of the present embodiment may also include: a transmitting unit which transmits, to a terminal, first configuration information including eDRX configuration values for an RRC inactive state; and a control unit which performs control to transmit, to the terminal in the RRC inactive state, downlink control information in a paging search space during a reception period in a given H-SFN indicated by the eDRX configuration values included in the first configuration information.

Further, the wireless communication method performed by the terminal of the present embodiment may include: a step of receiving first configuration information including eDRX configuration values for an RRC inactive state; and a step of performing control to monitor control channel candidates in a paging search space during a reception period in a given H-SFN indicated by the eDRX configuration values included in the first configuration information in the RRC inactive state.

What is claimed is:

1. A terminal comprising:

receiving circuitry configured to receive, from a core network device, first information used for configuring a cycle of discontinuous reception (DRX), and controlling circuitry configured to control, based on the cycle of the DRX, monitoring of physical downlink control channel (PDCCH) candidates in a search space for a paging in a paging occasion, wherein the receiving circuitry is configured to receive, from a base station, second information used for indicating that a parameter for determining a position of the paging occasion for a Radio Resource Control (RRC) inactive state is the same value as a parameter for determining the position of the paging occasion for a RRC idle state, and in a case where the terminal is in the RRC inactive state, the controlling circuitry is configured to control, the monitoring of the PDCCH candidates based on the second information.

2. The terminal according to claim 1, wherein the receiving circuitry configured to receive, from the core network device, a Non Access Stratum (NAS) message including the first information.

3. The terminal according to claim 1, wherein the core network device is Access and Mobility Management Function.

4. A base station comprising:

transmitting circuitry configured to transmit on a physical downlink control channel (PDCCH), to a terminal, downlink control information for a paging, and controlling circuitry configured to control, based on a cycle of discontinuous reception (DRX), monitoring of PDCCH candidates in a search space for the paging in a paging occasion, wherein the transmitting circuitry is configured to transmit, to the terminal, second information used for indicating that a parameter for determining a position of the paging occasion for a Radio Resource Control (RRC) inactive state is the same value as a parameter for determining the position of the paging occasion for an RRC idle state, and the controlling circuitry is configured to control, to the terminal in the RRC inactive state, the monitoring of the PDCCH candidates based on the second information.

5. A wireless communication method for a terminal comprising:

a step of receiving, from a core network device, first information used for configuring a cycle of discontinuous reception (DRX), a step of controlling circuitry configured to control, based on the cycle of the DRX, monitoring of physical downlink control channel (PDCCH) candidates in a search space for a paging in a paging occasion, a step of receiving, from a base station, second information used for indicating that a parameter for determining a position of the paging occasion for a Radio 5 Resource Control (RRC) inactive state is the same value as a parameter for determining the position of the paging occasion for an RRC idle state, and in a case where the terminal is in the RRC inactive state, a step of controlling the monitoring of the PDCCH 10 candidates based on the second information.

6. The wireless communication method according to claim 5, wherein the first information is included in a Non Access Stratum (NAS) message. 15

7. The wireless communication method according to claim 5, wherein the core network device is Access and Mobility Management Function.

* * * * *

20